(No Model.)
J. D. MOORE.
SHOE BRUSH.
No. 274,016.  Patented Mar. 13, 1883.
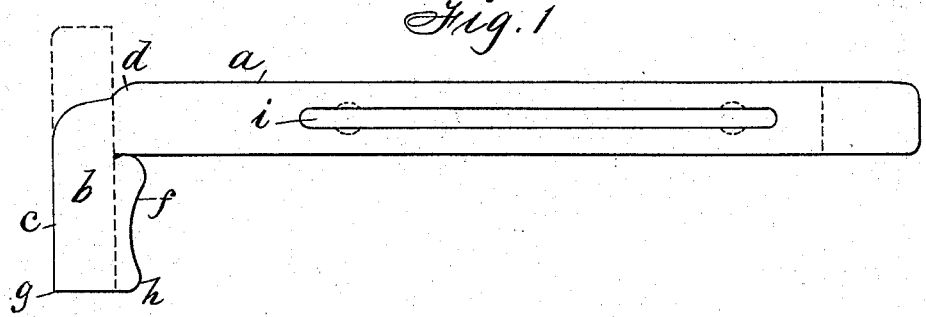
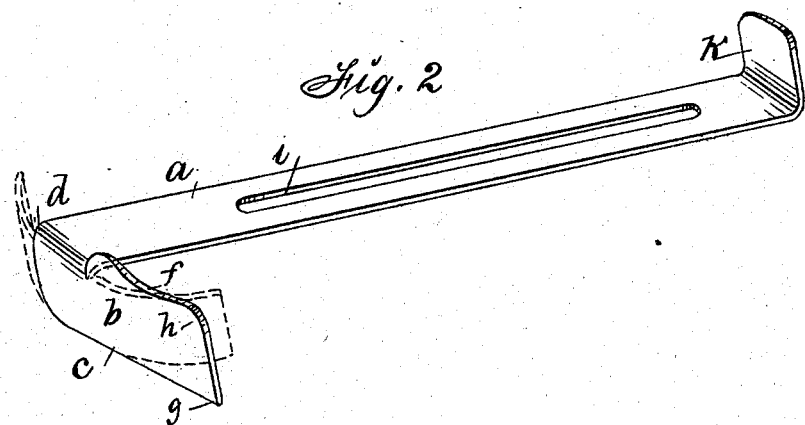
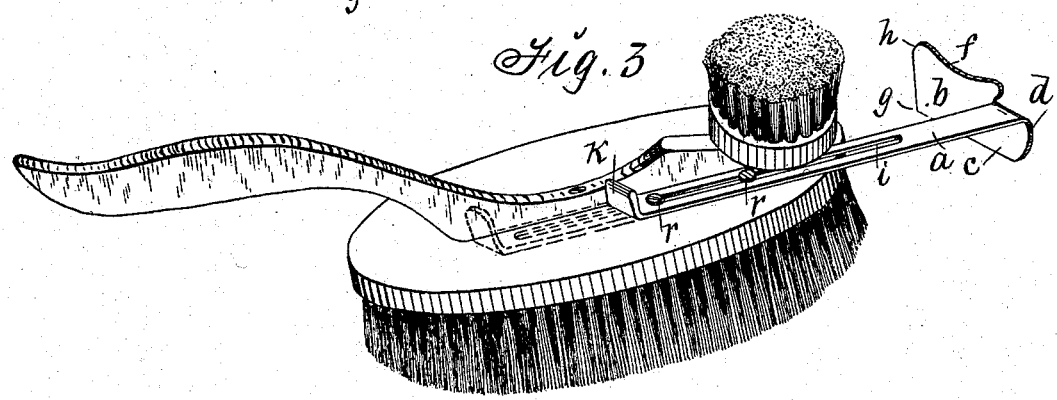
Witnesses:
H. A. Stoltenberg.
A. L. Pierce.
Inventor:
Rev. James D. Moore,
By Thomas G. Orwig, Atty.

UNITED STATES PATENT OFFICE.

JAMES D. MOORE, OF MOUNT AYR, ASSIGNOR OF ONE-HALF TO JOHN M. SHUCK AND THOMAS G. ORWIG, OF DES MOINES, IOWA.

SHOE-BRUSH.

SPECIFICATION forming part of Letters Patent No. 274,016, dated March 13, 1883.

Application filed October 12, 1882. (No model.)

*To all whom it may concern:*

Be it known that I, JAMES D. MOORE, of Mount Ayr, in the county of Ringgold and State of Iowa, have invented an Improved Shoe-Brush, of which the following is a specification.

The object of my invention is to provide a means for scraping dirt from boots or shoes that cannot be readily brushed off.

It consists in forming and combining an adjustable and detachable rigid scraper with a brush in such a manner that it can be readily projected or detached and advantageously used to scrape flat surfaces, and also concave and convex surfaces, to loosen adhering dirt preparatory to brushing, blacking, and polishing, and then again closed compactly upon the brush and out of the way when the brush is used for the common purposes for which brushes are made.

Heretofore the end of a straight metal strap has been bent at right angles to form a scraping device adapted to fit and slide in a slot formed in a brush. A metal scraper consisting of a slotted handle and a tapering pointed scraper, concave on one side and convex on the other, formed integral with the handle to project in the same plane with the handle, has also been adjustably and detachably connected with a brush; but my manner of forming a scraper to project laterally at right angles from a handle and to present an extended straight edge, and also an extended concave edge, is novel and greatly advantageous in accomplishing the results contemplated.

Figure 1 of my accompanying drawings is an outline view of a blank, such as I use for making my scraping device, cut or stamped from a metal plate by means of a die and press or in any suitable way. Fig. 2 is a perspective view, showing the blank bent into shape as required to form a complete device adapted to be applied and operated on a brush. Fig. 3 is a perspective view of my improved brush having a scraper combined therewith. Jointly considered, these figures clearly illustrate the construction, operation, and utility of my complete invention.

$a$ is a straight flat bar and the handle of my scraper.

$b$ is the scraper, extending at right angles from the rear end of the handle.

$c$ is the straight and bottom edge of the scraper, adapted for cleaning a flat surface.

$d$ is a convex corner and edge at the junction of the handle and scraper, adapted for cleaning a concave surface.

$f$ is the concave top edge of the scraper, adapted for cleaning a convex surface.

$g$ is a square corner at the bottom, adapted for cleaning corresponding corners.

$h$ is a rounded top corner, adapted for cleaning corresponding grooves in the wrinkled surface of leather.

$i$ is a longitudinal slot in the handle $a$.

$k$ is a catch formed on the end of the handle by simply bending it at right angles.

To combine my scraping device with a brush, I simply place the handle flat upon the back or top surface of the brush, at the side of the brush-handle, in such a manner that the scraper at the end of the scraper-handle will abut against the end of the brush and then pass two screws, $r$ $r$, through the slot of the scraper-handle and into the body of the brush in such a manner that the screws will form bearings upon which the scraper can slide.

In the practical use of my improved brush as a means for scraping dirt from a boot or shoe, I simply press against the catch on the end of the scraper-handle, and thereby slide the scraper on its bearings and cause it to project, as shown in Fig. 3, and then by seizing the brush-handle I can readily manipulate the scraper and apply it in various positions to scrape the flat, concave, and convex surfaces that need it previous to using the brush for dusting and applying blacking.

In place of forming my scraping device from metal plate, it may be cast in a mold. Its size and configuration may vary to suit different sizes and forms of brushes, and in place of fastening it on the outside surface of a brush a suitable groove or cavity may be formed in the body of the brush to receive the scraper shank or handle.

To adapt my scraper to be readily detached and then again replaced, I simply form enlargements in the slot $i$, as indicated by dotted lines in Fig. 1, to produce eyes through which the heads of the screws $r$ will pass.

To adapt the scraper to be closed flat against the rounded end of a brush, I curve it, as indicated by dotted lines in Fig. 2, to conform in shape with the curved surface at the end of the brush.

To hinge the scraper-handle to the brush so that it can be extended laterally or at right angles relative to the brush-handle, I simply remove one of the screws $r$ that extends through the slot in the handle.

To dispense with the slot in the handle $a$, I use staples or a sheath in lieu of screws for fastenings and bearings against which to slide the handle.

I claim as my invention—

1. As an improved article of manufacture, a boot and shoe scraper consisting of a handle adapted to be adjustably and detachably connected with a brush, and a scraper extending laterally at right angles from the end of the handle, substantially as set forth.

2. A boot or shoe scraper consisting of a straight handle, $a$, and a scraper, $b$, having a straight edge, $c$, and concave edge $f$, formed integral with and at right angles to the end of the handle, substantially as shown and described, to operate in the manner set forth.

3. In combination with a brush, the improved boot and shoe scraping device, consisting of the handle $a$, having a slot, $i$, and the scraper $b$, having a straight edge, $c$, a convex edge, $d$, a concave edge, $f$, a square corner, $g$, and a rounded corner, $h$, substantially as shown and described, to operate in the manner set forth.

JAMES D. MOORE.

Witnesses:
S. J. HURST,
W. W. THOMAS.